W. W. LILLARD.
HEATING MEANS.
APPLICATION FILED OCT. 26, 1917. RENEWED SEPT. 29, 1919.
1,349,136.
Patented Aug. 10, 1920.
2 SHEETS—SHEET 1.
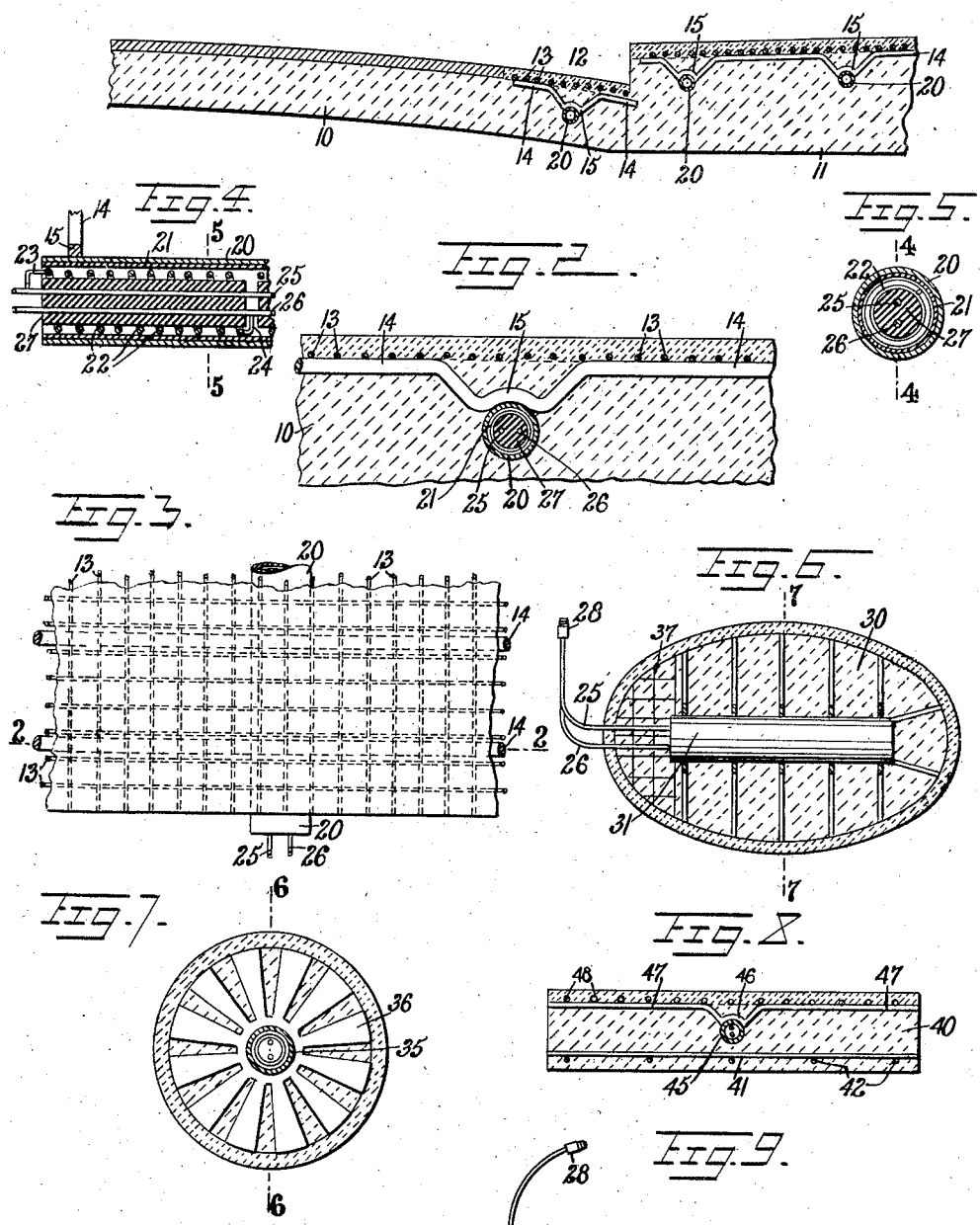

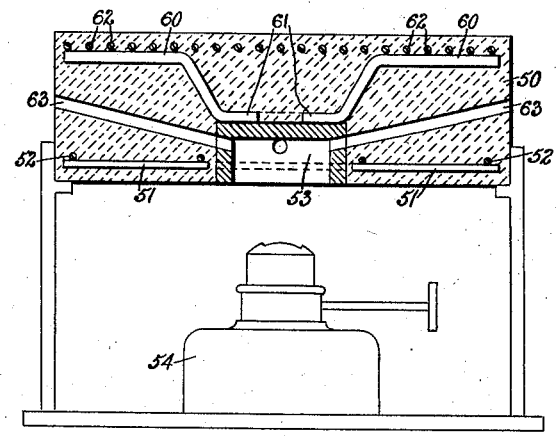
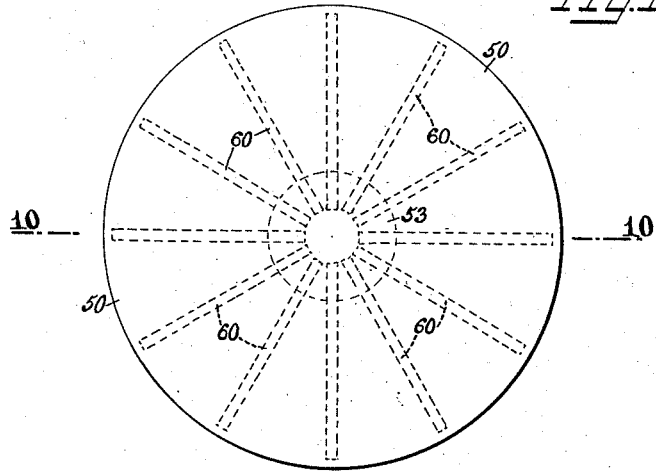

UNITED STATES PATENT OFFICE.

WILLIAM W. LILLARD, OF IRVINGTON, NEW JERSEY, ASSIGNOR OF ONE-HALF TO ERNEST JOHN KING, OF JERSEY CITY, NEW JERSEY.

HEATING MEANS.

1,349,136.     Specification of Letters Patent.     Patented Aug. 10, 1920.

Application filed October 26, 1917, Serial No. 198.654. Renewed September 29, 1919. Serial No. 327,264.

*To all whom it may concern:*

Be it known that I, WILLIAM W. LILLARD, a citizen of the United States, and a resident of Irvington, in the county of Essex and State of New Jersey, have invented a new and Improved Heating Means, of which the following is a full, clear, and exact description.

The object of the invention is to provide a new and improved heating means for heating monolithic structures thus rendering it serviceable for heating street gutters and sidewalks to melt the snow swept into the gutter or lying on the sidewalk, the heating means being also serviceable for heating monolithic floors of factories, schools and other buildings thus dispensing with radiators. The heating medium can also be used in incubators and brooders for hatching and raising chickens and the like. The heating means can also form individual portable heaters for use as bed warmers, foot warmers and the like.

In order to accomplish the desired result, use is made of a monolithic structure formed of a plastic material which is a relatively poor thermal conductor having embedded therein a heat distributing medium of some material which is a relatively good thermal conductor, the latter being in contact with a heat receiving medium embedded in said monolithic structure, said heat receiving medium being heated by a heating medium.

A practical embodiment of the invention is represented in the accompanying drawings forming a part of this specification, in which similar characters of reference indicate corresponding parts in all the views.

Figure 1 is a cross section of the heating means as applied to a street and sidewalk;

Fig. 2 is an enlarged cross section of a portion of the same on the line 2—2 of Fig. 3;

Fig. 3 is a plan view of the same;

Fig. 4 is an enlarged longitudinal central section of the heating coil within the tube;

Fig. 5 is a cross section of the same on the line 5—5 of Fig. 4;

Fig. 6 is a sectional plan view of the heating means in the form of a portable ovoidal warmer, the section being on the line 6—6 of Fig. 7;

Fig. 7 is a cross section of the same on the line 7—7 of Fig. 6;

Fig. 8 is a sectional side elevation of the heating means in the form of a slab, the section being on the line 8—8 of Fig. 9;

Fig. 9 is a plan view of the same;

Fig. 10 is a sectional side elevation of the heating means arranged for use in incubators and like apparatus, the section being on the line 10—10 of Fig. 11; and Fig. 11 is a plan view of the same.

The heating means illustrated in Figs. 1, 2, 3, 4 and 5 is shown applied to a street 10 and a sidewalk 11 of concrete or similar monolithic structure, and below the surface of the gutter 12 of the street 10 is embedded a heat distributing medium 13, preferably in the form of a wire netting resting on metallic bars 14 embedded in the monolithic structure. Each of the bars 14 is provided at its middle with an offset saddle 15 seated on a metallic tube 20 embedded in the monolithic structure and preferably projecting at one end thereof. The tube 20 is provided with an interior lining 21 of mica or similar non-conducting material, and within the tube is arranged an electric heating coil 22 of German silver or similar material capable of resisting an electric current. The heating coil 22 is connected at its ends by branch wires 23 and 24 with conductors 25 and 26 arranged within a core 27 of porcelain or other non-conducting material, the core 27 holding the conductors 25 and 26 spaced apart. The outer ends of the conductors 25 and 26 are connected with the usual contact plug 28 adapted to be screwed into the socket of line wires connected with a source of electrical energy to supply the said coil 22 with electricity and thus heat the same. The heat of the coil 22 is transmitted to the tube 20 from which the heat is conducted by the bars 14 to the heat distributing medium 13 to heat the monolithic structure close to the surface thereof. By reference to Fig. 1 it will be noticed that a similar heating means is arranged in the sidewalk 11 but in this case two or more tubes 20 and heating coils are employed together with a corresponding number of saddles 15 on the bars 14. In practice, the netting forming the heat distributing medium 13 is preferably located immediately below the hardened top portion of the monolithic structure, as indicated in Figs. 1 and 2.

When heating means are employed under the gutter 12 or under the sidewalk 11 it is evident that snow removed from the roadway into the gutter 12 readily melts and can flow into the sewer for carrying off the snow water. In a like manner the snow on the sidewalk is melted and flows into the gutter 12 to be carried off to a place of discharge.

It is understood that the heating means employed in a monolithic floor of cement or a similar material heats the floor, and the room is heated by radiation and convection. By this arrangement, radiators and the like heat distributing means are entirely dispensed with. It will be seen that by use of this heating means the floor of a room is uniformly heated and all parts of the room will be at the same temperature. Also, since the floor at every point in the room will always be slightly warm, persons standing or sitting in the room will never be uncomfortable from cold feet as is often the case in rooms heated by radiators of the commonly used types which are generally placed near one side of the room.

The heating means may be in the form of a warmer for the feet or for beds, and in this case the monolithic structure 30 shown in Figs. 6 and 7 has embedded therein a tube 31 containing the heating coil 22 connected by the conductors 25 and 26 with the plug 28, as previously explained, to heat the tube 31. The latter is engaged exteriorly by hubs 35 from which radiate wings 36 embedded within the monolithic structure 30 and terminating near the outer surface thereof in contact with the netting 37. The heat from the tube 31 is distributed by the hubs 35 and their wings 36 and the wire netting 37 within the monolithic structure to heat the same, especially on the surface, thus providing a convenient foot or bed warmer. It will be seen that the heat distributing medium in the above described heating means also serves as a reinforcement for the plastic material of which the monolithic mass is formed greatly increasing the strength of the body.

In the modified form shown in Figs. 8 and 9, the monolithic structure is in the form of a slab 40 reinforced in its lower portion by longitudinal and transverse wires 41 and 42 to give the desired strength to the slab. Within the slab 40 is embedded a tube 45 containing the heating coil 22 in the manner above described, and with its conductors 25 and 26 connected with the plug 28, as plainly shown in Fig. 9. The tube 45 is engaged by saddles 46 of bars 47 similar to the bars 14 and extending close to the top surface of the slab and are in contact with the netting 48.

The heating means as used in an incubator or brooder for hatching eggs or raising small chicken and the like is shown in Figs. 9 and 10. It is in the form of a circular or square slab 50 of monolithic material reinforced in its lower portions by longitudinal and transverse wires 51, 52. In the center of the slab is embedded a metal cup or receptacle 53 with its open end down and extending to the under surface of the slab 50. Under this cup will be placed an oil lamp, gas light or other suitable heating medium 54. Embedded in the monolithic slab 50 are rods 60 which extend from the center of the slab to its outer edges. Each rod 60 is provided with an offset 61 in contact with the cup 53. Near the top surface of the slab 50 is embedded wire netting 62 in contact with the rods 60. Vent holes 63 are molded in the slab 50 to allow the escape of the gases from the heating medium 54.

Since the material of which the monolithic structure is made is a relatively poor thermal conductor, a large per cent. of the heat from the heating medium will be conducted away by the heat distributing medium and will be utilized to heat the surface of the monolithic structure, and by use of this heating means a given amount of heat can be made to heat a much larger surface area of a monolithic structure than by use of similar heating means not employing a heat distributing medium embedded in the monolithic structure.

I do not limit myself to the particular form of the heating means shown and described as the same may be varied without deviating from the spirit of my invention.

Having thus described my invention, I claim as new and desire to secure by Letters Patent:—

1. A heating means, comprising a monolithic structure of relatively low thermal conductivity, a heat distributing medium of relatively high thermal conductivity embedded in the said structure in close proximity to its upper surface, and a heat receiving medium embedded in the said monolithic structure below and in contact with the said heat distributing medium, and means for heating the said heat receiving medium.

2. A heating means comprising a monolithic structure, a heat distributing medium embedded therein, a tube embedded in said monolithic structure and in contact with the said heat distributing medium, and means for heating the said tube interiorly, the said heat distributing medium being a better thermal conductor than the said monolithic structure.

3. A heating means, comprising a monolithic structure, a heat distributing medium embedded therein a short distance below its upper surface, and an electric heating coil embedded in the said monolithic structure below and in contact with the said heat distributing medium, the said heating coil being arranged for connection with a source of electrical energy.

4. A heating means, comprising a monolithic structure, a heat distributing medium embedded in said structure and formed of a heat distributing wire netting and metallic contact bars, of which the wire netting is in close proximity to the surface of the monolithic structure and is in contact with the said contact bars, a tube embedded in the said monolithic structure and in contact with the said heat distributing medium, and means for heating the said tube interiorly, the said heat distributing medium being a better thermal conductor than the said monolithic structure.

5. A heating means, comprising a monolithic structure, a heat distributing medium embedded in the said structure in close proximity to its upper surface, a tube embedded in the said structure below and in contact with the said heat distributing medium, and an electric heating coil arranged within the said tube to heat the latter, the said heating coil having electric conductors extending to the outside for connection with a source of electrical energy.

6. A heating means, comprising a monolithic structure, a heat distributing medium embedded in the said structure, and formed of a heat distributing wire netting and metallic contact bars, of which the wire netting is in close proximity to the surface of the monolithic structure and is in contact with the said contact bars, a metallic tube embedded in the said monolithic structure and in contact with the said contact bars, the said tube being provided with a lining of a non-conducting material, an electric heating coil within the said tube and in contact therewith, and electric conductors connected with the said coil and extending to the outside of the said monolithic structure for connection with a source of electrical energy.

7. A heating means, comprising a monolithic structure, a heat distributing medium embedded in the said structure and formed of a heat distributing wire netting and metallic contact bars, of which the wire netting is in close proximity to the surface of the monolithic structure and is in contact with the said contact bars, the latter being provided with curved offset saddles, a metallic tube embedded in the said monolithic structure and engaged exteriorly by the said saddles, an electric heating coil within the said tube and in contact therewith, a core within the said coil, and electric conductors within the said core and connected with the said coil, the said conductors extending to the outside of the structure for connection with a source of electrical energy.

8. A heating means, comprising a work surface, a network of heat conducting wires under the outer surface of the said work surface, a metal conductor connected with the said network of heat conducting wires, and a heating element connected with the said metal conductor.

WILLIAM W. LILLARD.